Patented June 19, 1951

2,557,312

UNITED STATES PATENT OFFICE 2,557,312

REPROPORTIONATION OF DISULFIDES

Wayne A. Proell, Chicago, Ill., and Chester E. Adams, Highland, Ind., assignors to Standard Oil Company, Chicago, Ill., a corporation of Indiana No Drawing. Application February 12, 1949, Serial No. 76,202

10 Claims. (Cl. 260—608)

This invention relates to the preparation of symmetrical organic disulfides and has reference more particularly to a process for converting unsymmetrical disulfides containing alkyl, aryl, alkaryl, or aralkyl radicals in to symmetrical disulfides. The invention also relates to the production of intermediates useful in the preparation of specific organic sulfonates.

Organic disulfides can be generally designated as RSSR′ where R and R′ may be organic radicals such, for example, as alkyl, aryl or aralkyl radicals. The lower alkyl disulfides are produced in large quantities in the refining of petroleum naphthas. Disulfides can be formed from two mercaptan molecules by elimination of hydrogen and linkage of the residues, thus:

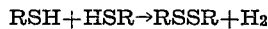

The alkyl disulfides that are produced in petroleum naphtha refining are to a large extent unsymmetrical, i. e., they contain in each instance two different alkyl radicals. For example, a product resulting from the treatment of sour oils and termed "plant disulfide oil" contains approximately 28% of methyl ethyl disulfide and a mixture of other symmetrical and unsymmetrical disulfides including methyl propyl disulfide, diethyl disulfide, etc. It is an object of this invention to produce symmetrical organic disulfides from such mixture of unsymmetrical disulfides. It is a further object of the invention to prepare specific symmetrical organic disulfides which can be used in producing the corresponding pure sulfonic acids, sulfonyl halides or other valuable end products. Other objects will be apparent as the detailed description of the invention proceeds.

The present invention comprehends the reproportionation of unsymmetrical disulfides such as those which are found in refinery disulfide oils. Such reproportionation is effected by heating the unsymmetrical disulfide, or mixtures thereof or mixtures containing the same, in solution in an alkanolamine solvent and in the presence of an alkali metal sulfide as a catalyst and simultaneously distilling from the reaction mixture the so-prepared symmetrical disulfides. The distillation is preferably carried out under a sufficient vacuum to maintain distillation temperatures below the decomposition temperatures of the disulfides in the system. Decomposition of disulfides can substantially be avoided by maintaining distillation temperatures below 200° C. and preferably below 150° C.

The selected alkanolamine solvent in any particular case is one which boils at least 25° C. and preferably about 50° C. above the boiling point of the symmetrical disulfide being prepared. For example, when preparing dimethyl disulfide, having a boiling point of 116° to 118° C. at atmospheric pressure, from a mixture-containing unsymmetrical disulfides, ethanolamine, having a boiling point of 171° C. at 757 mm. Hg pressure, can be employed. Other useful alkanolamine solvents include diethanolamine, triethanolamine, iso-propanolamine, triisopropanolamine, butanolamine, and isobutanolamine. The alkanolamine solvents are non-reducing and are inert in the presence of the disulfides and catalyst under the conditions of reaction.

The process is applicable generally to the preparation of symmetrical organic disulfides from unsymmetrical sulfides according to the formula:

where R and R′ are different and each can be an alkyl, aryl, aralkyl, or alkaryl radical, at least one of the radicals preferably being an alkyl radical. Any alkyl radical may be present from methyl to hexadecyl but preferred stocks are those containing radicals having from one to seven carbon atoms and particularly methyl, ethyl, propyl, butyl, and pentyl radicals. Examples of aryl, alkaryl and aralkyl radicals are phenyl, tolyl, xylyl, phenylmethyl, and naphthyl.

A disproportionation reaction whereby unsymmetrical disulfides are prepared from symmetrical disulfides is disclosed and claimed in copending application, S. N. 704,991, filed October 22, 1946, now Patent No. 2,521,870 by one of the present applicants and now issued as U. S. Patent 2,521,870 entitled "Disproportionation of Organic Disulfides"; in that case a hydroxyl type solvent, preferably an alcohol, is suitable for use but hydroxyl type solvents cannot be used in the present reaction. The preparation of the unsymmetrical disulfides in that case also requires from 0.5 to 20% of an alkali hydroxide based on the weight of the mixed sulfides; the present reaction does not require any alkali hydroxide. In the present case it is necessary in fact to have a non-reducing solvent present and one having a high enough dielectric constant to permit free exchange of the alkyl, aryl and aralkyl radicals. From one to fifty per cent by volume, and preferably about five to ten per cent by volume of solvent based upon the total volume of the mixture is employed. About one-quarter to ten per cent by weight, preferably about one to four per cent of alkali metal sulfide is sufficient to catalyze the exchange reaction. Although substantial yields of symmetrical disulfides can be obtained by relatively rapid distillation from the reaction mixture, the highest yields are obtained when the unsymmetrical sulfides, solvent and catalyst are allowed to remain in contact for a period of several hours, for example, 1 to 10 hours. As aforestated, the temperatures may be those suitable for fractional distillation with reflux and may be kept low by the use of vacuum, especially in order to avoid temperatures higher than about 200° C.

*Example 1*

In one example of carrying out the process of this invention, 100 cc. of pure methyl ethyl disulfide was employed in order to demonstrate the process where the entire charge is unsymmetrical. The methyl ethyl disulfide was mixed with 10 grams of triisopropanolamine and two grams of sodium sulfide, $Na_2S \cdot 9H_2O$. The batch was then heated under a reduced pressure of about 120 mm. of mercury absolute and the disulfide was slowly distilled off under said reduced pressure in a spiral-packed fractionating column. About 37 cc. of dimethyl disulfide, boiling at 55° C. at 121 mm., was obtained. An intermediate product, boiling at 64-90° C. at 122 mm., was then withdrawn and thereafter diethyl disulfide was recovered while distilling at about 93° C. About 90% of the theoretical yield of dimethyl disulfide was obtained from the methyl ethyl disulfide.

*Example 2*

In another example, a mixture of methyl isopropyl disulfide with some diethyl disulfide and a minor amount of methyl ethyl disulfide and methyl n-propyl disulfide was reproportionated. This mixture was obtained by distilling a plant disulfide oil. About 1500 cc. thereof were charged to a Stedman column and fractionated therein. A fraction having a boiling point of 69° to 70° C. at 55 mm. Hg or, as calculated, of 145° to 147° C. at 760 mm. Hg, was obtained and 100 grams of this fraction were mixed with 10 grams of triisopropanolamine and 2 grams of sodium sulfide, $Na_2S \cdot 9H_2O$. The mixture was refluxed under a pressure of 55 mm. Hg absolute in a ten-plate Stedman column. A fraction consisting of about 17 grams of dimethyl disulfide was obtained as a distillate. On a mol basis, the total charge was 0.73 mol, the theoretical yield, if all the charge had been methyl isopropyl disulfide, would be 0.37 mol and the actual yield obtained on this basis, therefore, would be 46%. With regard to the fact that a considerable proportion of the said 69° to 70° C. fraction consisted of other disulfides than methyl isopropyl disulfide the yield, calculated upon the basis or reproportionation of the unsymmetrical disulfides to dimethyl disulfide, is substantially quantitative.

The symmetrical disulfides obtainable by the described process from unsymmetrical disulfides that are present in considerable quantity in treated refinery oil are readily oxidized to form specific, unmixed sulfonic acids that are substantially entirely a single alkyl, alkaryl, aralkyl, or aryl sulfonic acid which are in turn useful for such varied purposes as solvents or catalysts. Recovered intermediate fractions can be treated again according to the process of invention or they can be disproportionated by the process disclosed in the said application, Ser. No. 704,991. Parallel operation of the two processes provides considerable opportunity to manipulate the operation so as to obtain high yields of selected disulfides and to utilize in one of the processes the intermediate fractions or slop cuts obtained from the other process.

Having thus described our invention, we claim:

1. A process for the reproportionation of unsymmetrical organic disulfides to symmetrical organic disulfides having the formula $RS_2R'$ in which R and R' are different hydrocarbon radicals comprising the steps of admixing at least one unsymmetrical organic disulfide with from one per cent to fifty per cent by weight of an alkanolamine solvent and from one-quarter per cent to ten per cent by weight of an alkali metal sulfide, heating the mixture and fractionally distilling therefrom at a temperature above the initial boiling point of the mixture at ambient pressure and less than about 200° C., a fraction containing at least one symmetrical disulfide.

2. The process for preparing a dialkyl disulfide from a mixture of unsymmetrical alkyl disulfides comprising the steps of admixing the said mixture of unsymmetrical alkyl disulfides with one per cent to fifty per cent of an alkanolamine and from one-quarter per cent to ten per cent by weight of an alkali metal sulfide, heating the admixture and fractionally distilling under vacuum at a temperature greater than room temperature and less than about 200° C. and recovering a fraction consisting essentially of a symmetrical dialkyl disulfide.

3. The process of claim 2 in which the alkanolamine is an ethanolamine.

4. The process of claim 2 in which the alkanolamine is triisopropanolamine.

5. The process of claim 2 in which the unsymmetrical disulfides include methyl, ethyl disulfide and the recovered symmetrical dialkyl disulfide is dimethyl disulfide.

6. The process of claim 2 wherein the admixture is heated at substantially reflux temperature for a period of at least one hour.

7. The process of claim 2 in which the alkali metal sulfide is sodium sulfide present as $$Na_2S \cdot 9H_2O$$

in a quantity of one per cent to four per cent by weight of the admixture.

8. The process of preparing a dialkyl disulfide from a mixture of unsymmetrical alkyl disulfides comprising the steps of admixing the said mixture of unsymmetrical alkyl disulfides with one per cent to fifty per cent of an alkanolamine having a boiling point at least twenty-five centigrade degrees above that of the said dialkyl disulfide and from one-quarter per cent to ten per cent by weight of an alkali metal sulfide, heating the admixture for a period of from one to ten hours and fractionally distilling under vacuum at a temperature greater than room temperature and less than about 200° C. and recovering a fraction consisting essentially of a symmetrical dialkyl disulfide.

9. A process for the preparation of a symmetrical dialkyl disulfide from an oil comprising essentially unsymmetrical dialkyl disulfides that are obtained by sweetening refinery oil, the said process comprising: fractionally distilling the said mixture of unsymmetrical dialkyl disulfide oil and thereby separating the said oil into fractions containing predominantly specific unsymmetrical dialkyl disulfides; admixing with a selected fraction from the above distillation from one per cent to fifty per cent of an alkanolamine and from one-quarter per cent to ten per cent by weight of an alkali metal sulfide; heating the admixture at a pressure below atmospheric pressure and at a reflux temperature greater than room temperature and less than 200° C. for a period of from one to ten hours; during said heating, distilling the mixture at a pressure below atmospheric pressure and thereby recovering a fraction containing unmixed symmetrical dialkyl disulfide.

10. The process of claim 9 in which the selected, separated fraction comprises unsymmetrical dialkyl disulfides having alkyl radicals of one to seven carbon atoms per radical.

WAYNE A. PROELL.
CHESTER E. ADAMS.

REFERENCES CITED

The following references are of record in the file of this patent:

UNITED STATES PATENTS

| Number | Name | Date |
| --- | --- | --- |
| 2,204,210 | Farlowe | June 11, 1940 |
| 2,433,395 | Proell | Dec. 30, 1947 |

OTHER REFERENCES

Bersin et al., Berichte, vol. 71, 1015–24 (1938).